United States Patent
Poss et al.

(10) Patent No.: US 11,615,804 B1
(45) Date of Patent: Mar. 28, 2023

(54) DISK DRIVE BIASING TWO WRITE ASSIST ELEMENTS USING THREE TERMINAL CONTROL CIRCUITRY

(71) Applicant: Western Digital Technologies, Inc., San Jose, CA (US)

(72) Inventors: Joey M. Poss, Rochester, MN (US); John T. Contreras, Palo Alto, CA (US); Ian Robson McFadyen, San Jose, CA (US); Yaw Shing Tang, Saratoga, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/885,143

(22) Filed: May 27, 2020

Related U.S. Application Data

(60) Provisional application No. 62/860,717, filed on Jun. 12, 2019.

(51) Int. Cl.
| | |
|---|---|
| *G11B 5/02* | (2006.01) |
| *G11B 5/235* | (2006.01) |
| *G11B 5/31* | (2006.01) |
| *G11B 5/127* | (2006.01) |
| *G11B 5/00* | (2006.01) |

(52) U.S. Cl.
CPC .............. *G11B 5/02* (2013.01); *G11B 5/1278* (2013.01); *G11B 5/235* (2013.01); *G11B 5/314* (2013.01); *G11B 5/3146* (2013.01); *G11B 5/3113* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,049,984 B2 | 11/2011 | Contreras et al. | |
| 8,570,684 B1 | 10/2013 | Contreras et al. | |
| 8,599,506 B2 | 12/2013 | Contreras et al. | |
| 9,672,846 B1 | 6/2017 | Tanaka et al. | |
| 10,770,104 B1* | 9/2020 | Chen et al. | G11B 5/1278 |
| 2006/0044682 A1 | 3/2006 | Le et al. | |
| 2015/0043106 A1* | 2/2015 | Yamada et al. | G11B 5/1278 360/123.05 |
| 2020/0075045 A1* | 3/2020 | Narita et al. | G11B 5/1278 |

* cited by examiner

*Primary Examiner* — Craig A. Renner
(74) *Attorney, Agent, or Firm* — Patterson + Sheridan, LLP; Steven H. VerSteeg

(57) ABSTRACT

A data storage device is disclosed comprising a storage medium and a head configured to access the storage medium, wherein the head comprises a first write assist element (WA1) comprising a first terminal and a second terminal and a second write assist element (WA2) comprising a first terminal and a second terminal. The second terminal of the WA1 and the second terminal of the WA2 are coupled together to form a common node. A first bias signal is applied to the first terminal of the WA1, a second bias signal is applied to the first terminal of the WA2, and a common mode voltage is applied to the common node.

15 Claims, 6 Drawing Sheets

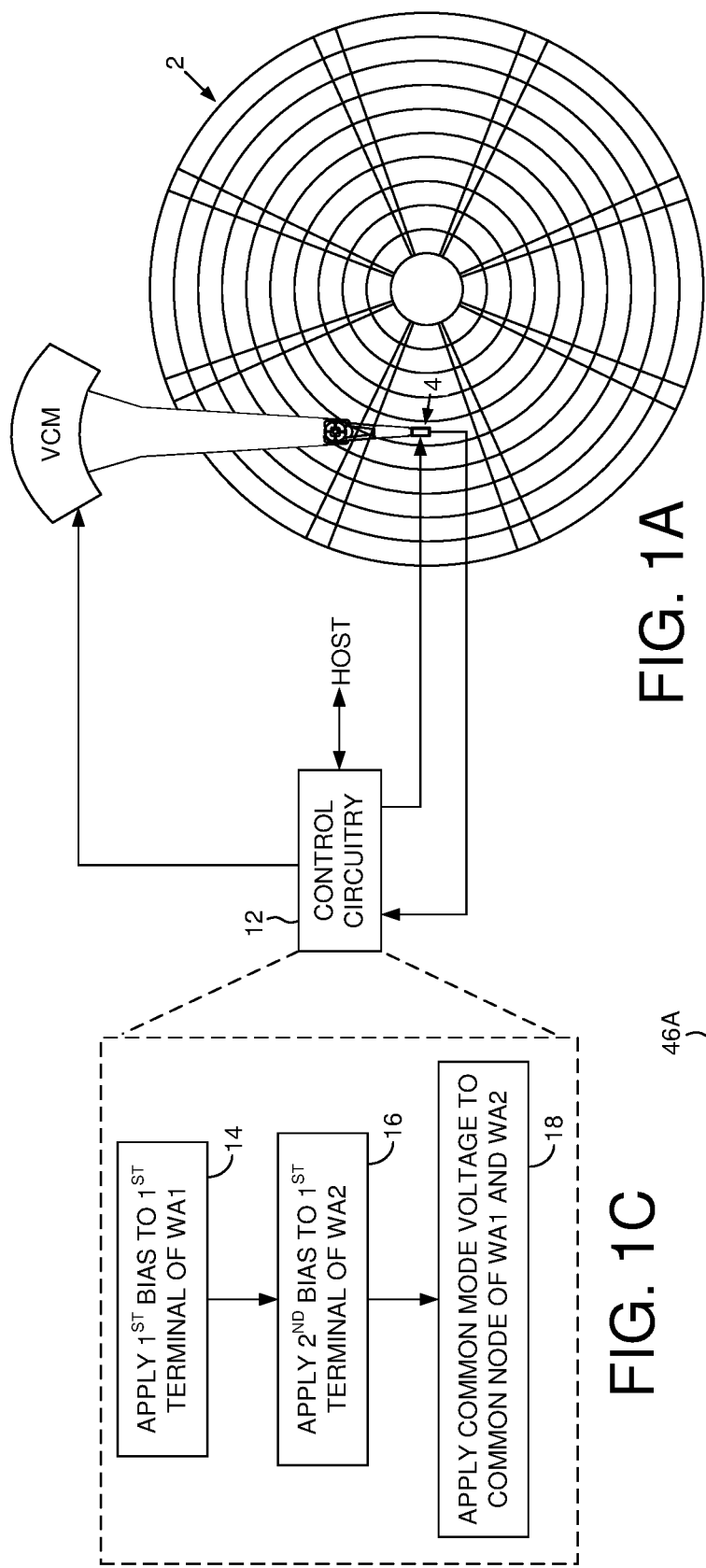
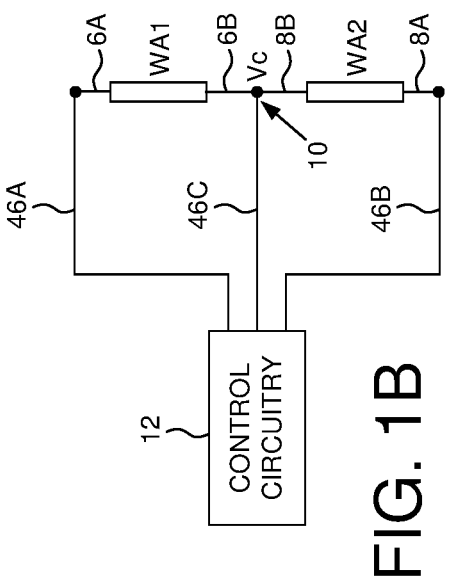

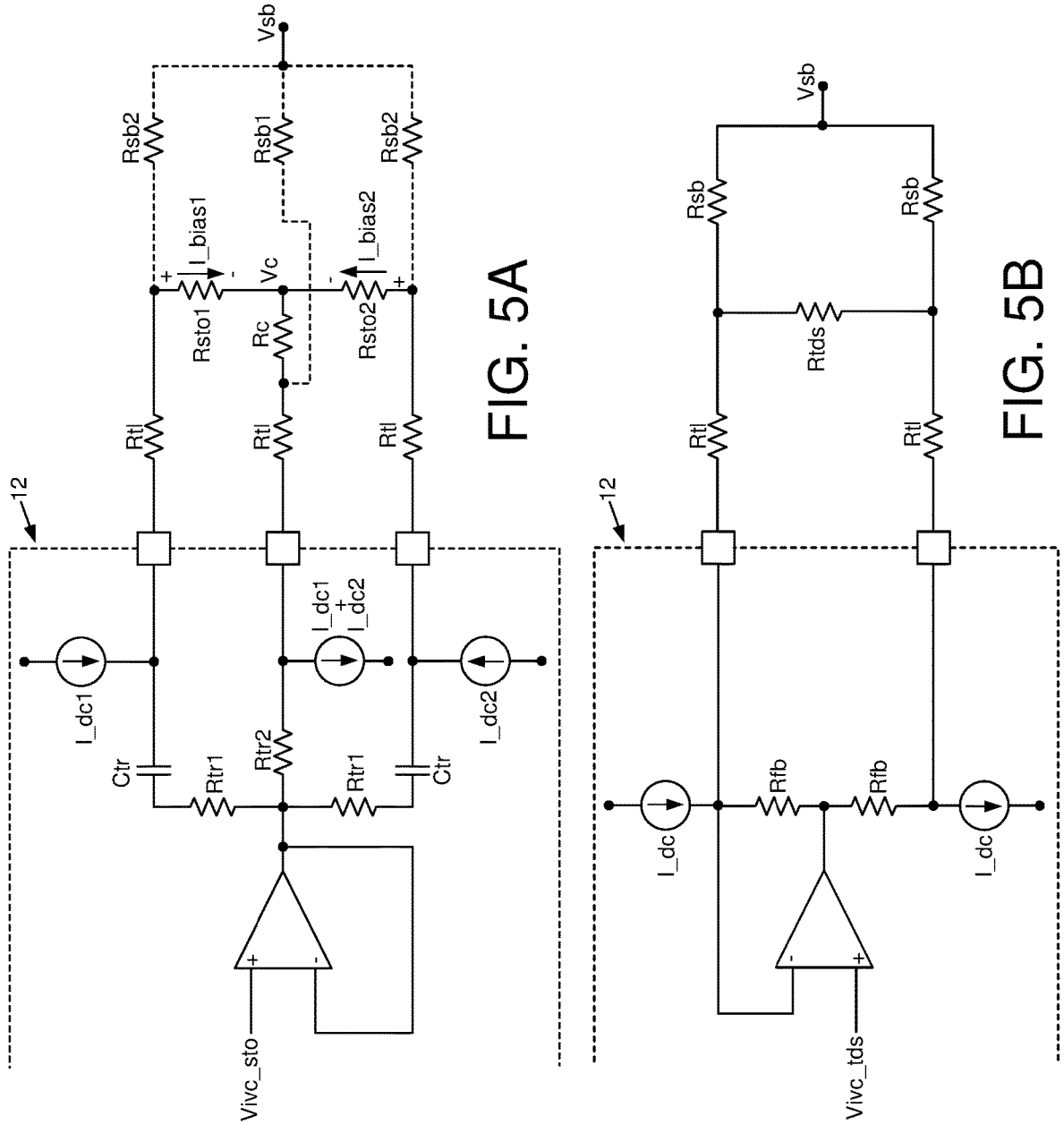

DISK DRIVE BIASING TWO WRITE ASSIST ELEMENTS USING THREE TERMINAL CONTROL CIRCUITRY

CROSS REFERENCE TO RELATED APPLICATIONS

This application claims priority to U.S. Provisional Patent Application Ser. No. 62/860,717, filed on Jun. 12, 2019, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

BRIEF DESCRIPTION OF THE DRAWINGS

FIG. 1A shows a data storage device in the form of a disk drive according to an embodiment comprising a head actuated over a disk surface.

FIG. 1B shows an embodiment wherein the head comprises first and second write assist elements WA1 and WA2 biased using three terminals.

FIG. 1C shows a flow diagram according to an embodiment wherein respective bias signals are applied to first terminals of the write assist elements and a common mode voltage is applied to the second terminals of the write assist elements which are connected together to form a common node.

FIG. 5A shows an embodiment wherein the control circuitry of FIG. 3C further comprises components for setting a potential of a slider body of the head to a level different than the potential configured for a main pole of the head.

FIG. 5B shows an embodiment wherein the control circuitry further comprises components for biasing a touchdown sensor and configuring a potential of the slider body.

DETAILED DESCRIPTION

Figure 2A:
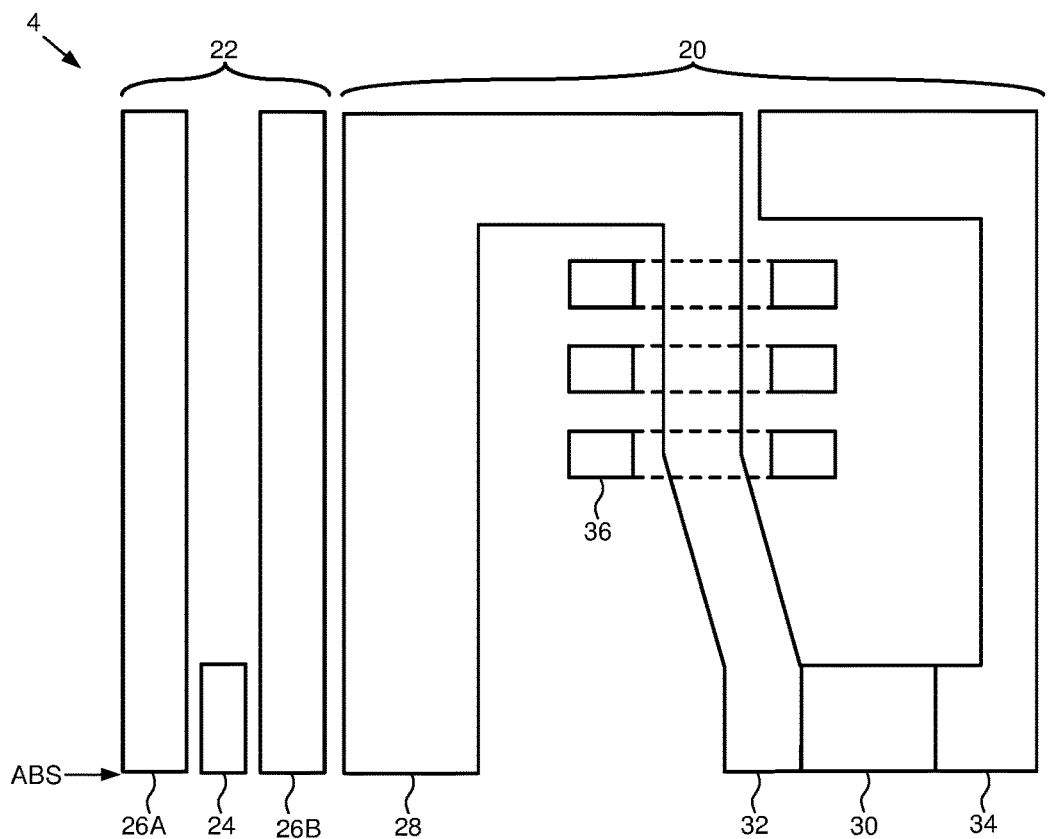
FIG. 2A shows a prior art head wherein a write assist element comprises a STO.

FIG. 1A shows a data storage device in the form of a disk drive according to an embodiment comprising a storage medium in the form of a disk surface 2, and a head 4 configured to access the disk surface 2. FIG. 1B shows an embodiment wherein the head 4 comprises a first write assist element (WA1) comprising a first terminal 6A and a second terminal 6B, and a second write assist element (WA2) comprising a first terminal 8A and a second terminal 8B. The second terminal 6B of the WA1 and the second terminal 8B of the WA2 are coupled together to form a common node 10. The disk drive further comprises control circuitry 12 configured to execute the flow diagram of FIG. 1C, wherein a first bias signal is applied to the first terminal of the WA1 (block 14), a second bias signal is applied to the first terminal of the WA2 (block 16), and a common mode voltage (Vc) is applied to the common node (block 18).

Although the figures following show STOs as example write assist elements, the various control circuitry implementations disclosed herein can be used with write assist elements that may comprise different materials than an STO, such as a STO stack without certain layers such as the field generating/oscillation layer or the spin polarization/spin injection layer, or a conductive stack serving as the write assist element.

FIG. 2A shows a cross-sectional view of a prior art head 4 comprising write elements 20 configured to write data to the disk surface 2, and read elements 22 configured to read data from the disk surface 2. The bottom surface of the head 4 facing the disk surface 2 is referred to as an air bearing surface (ABS) wherein an air bearing forms between the head 4 and the disk surface 2 due to the disk spinning such that the head 4 effectively flies above the disk surface 2. The read elements 22 of the head 4 may comprise a magnetoresistive (MR) read element 24 that is fabricated between MR shields 26A and 26B. Other embodiments may employ a different read element, such as a suitable magnetic tunneling junction (MTJ) read element. The write elements 20 comprise a return pole 28, a write assist element in the form of a STO 30 fabricated between a main pole 32 and a trailing shield 34, and a write coil 36 that excites the main pole 32 to generate a magnetic write field that magnetizes the disk surface 2, thereby writing data to the disk surface 2. Other heads may employ a different type of write assist element, such as a laser diode and NFT in a HAMR disk drive.

Figure 2B:
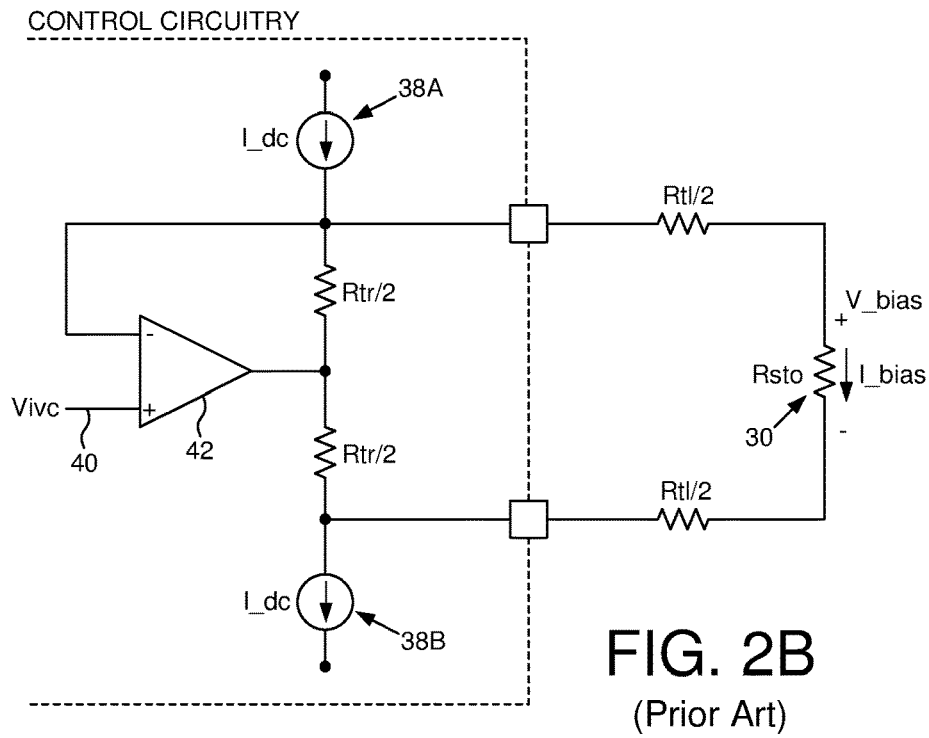
FIG. 2B shows prior art control circuitry for biasing the STO of FIG. 2A.

FIG. 2B shows prior art control circuitry for biasing a write assist element (STO 30 in this example) with a bias current I_bias and a bias voltage V_bias. The bias current I_bias is generated by a first current source 38A configured to source the bias current and a second current source 38B configured to sink the bias current. A common mode voltage of the STO 30 is configured by an input voltage Vivc 40 of a differential amplifier 42, thereby controlling an interface voltage of the head 4 relative to a potential at the disk surface 2. Preferably the interface voltage is configured to be a different potential than the disk surface 2 in order to extend the life of the head 4. Termination resistors Rtr/2 suppress unwanted noise coupling from external sources such as the alternating write current applied to the write coil 36. The value of Rtr/2 is preferably matched to a characteristic impedance of the transmission line Rtl/2 that connects the STO 30 integrated within the head 4 to the control circuitry.

Figure 3A:
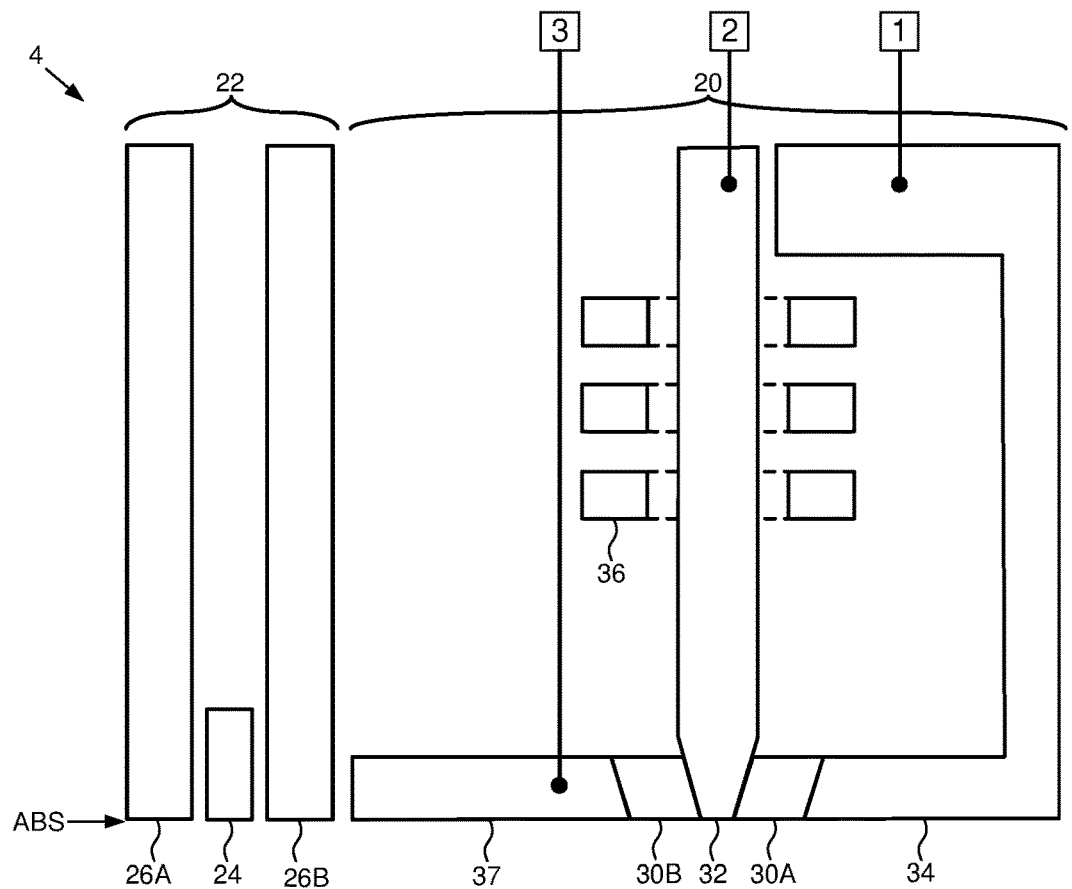
FIG. 3A shows a head according to an embodiment comprising first and second write assist elements in the form of first and second STOs.
Figure 3B:
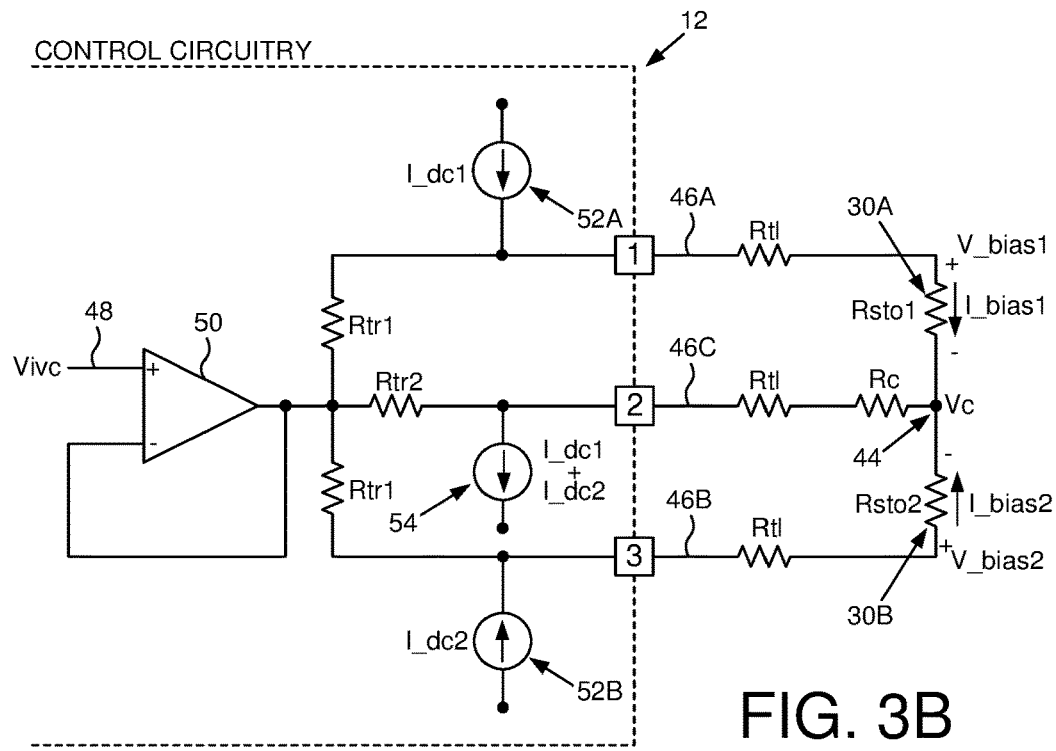
FIG. 3B shows control circuitry according to an embodiment configured to bias the first and second STOs using three terminals.

It may be desirable to integrate two or more write assist elements in the head 4 in order to enhance the write assist effect during write operations. FIG. 3A shows an embodiment wherein the head 4 may comprise a first STO 30A fabricated between a main pole 32 and a trailing shield 34, and a second STO 30B fabricated between the main pole 32 and a leading shield 37. FIG. 3B shows control circuitry 12 according to an embodiment that employs three terminals to bias two write assist elements (two STOs in this example). In this embodiment, respective bias signals (bias currents I_dc1 and I_dc2 in this example) are applied to the first terminals of each STO 30A and 30B, and the second terminals of each STO 30A and 30B are coupled together to form a common node 44 (in the embodiment of FIG. 3A, the common node is the main pole 32 of the head 4).

Figure 3C:
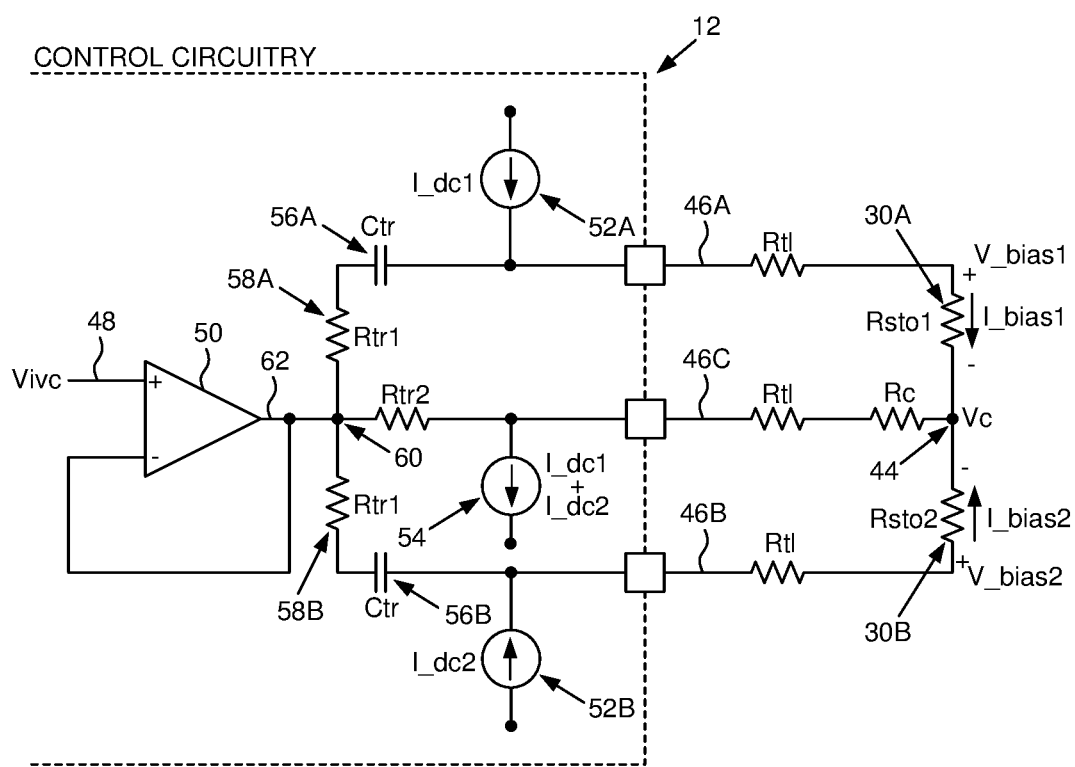
FIG. 3C shows an embodiment wherein the control circuitry further comprises isolation capacitors for isolating the termination resistors from the DC current sources.

The control circuitry of FIGS. 3B-3C comprises several resistors (Rc and Rtr2), and one or more capacitors (Ctr). A first transmission line 46A couples the control circuitry 12 to the first terminal of the first STO 30A, a second transmission line 46B couples the control circuitry 12 to the first terminal of the second STO 30B, and a third transmission line 46C couples the control circuitry 12 to the common node 44. A common mode voltage Vc is generated at the common node 44 by configuring an input voltage Vivc 48 of a differential amplifier 50, thereby controlling an interface voltage of the head 4 relative to a potential at the disk surface 2. Preferably the interface voltage is configured to be a different potential than the disk surface 2 in order to extend the life of the head 4.

A current source 54 is configured to sink a third bias current from the third transmission line 46C, wherein the third bias current is substantially equal to a sum of the first and second bias currents I_dc1 15 and I_dc2 sourced by current sources 52A and 52B, thereby maintaining the common mode voltage Vc at the target value configured by the input voltage Vivc 48.

The current sources 52A and 52B for generating the first and second bias currents I_dc1 and I_dc2 as well as the current source 54 for generating the third bias current (I_dc1+I_dc2) may be implemented in any suitable manner, wherein in one embodiment the current sources may be generated as the output of suitable operational transconductance amplifiers. Termination resistors Rtr1 suppress unwanted noise coupling from external sources such as the alternating write current applied to the write coil 36. The value of the termination resistors Rtr is preferably matched to a characteristic impedance of the transmission lines Rtl that connects the STOs 30A and 30B integrated within the head 4 to the control circuitry 12.

In the embodiment of FIG. 3B, part of the bias currents I_dc1 and I_dc2 will flow through the respective termination resistors Rtr1 due to the values and tolerances of Rtr1 and Rtl as well as the write assist elements Rsto1 and Rsto2. In an embodiment where these resistances may be difficult to measure, the bias currents I_dc1 and I_dc2 may be configured lower than necessary to ensure the write assist elements are not over biased, leading to suboptimal performance of the write assist elements. Accordingly in one embodiment of the control circuitry shown in FIG. 3C, a first isolation capacitor 56A may isolate the first termination resistor Rtr1 58A from the first current source 52A, and a second isolation capacitor 56B may isolate the second termination resistor Rtr1 58B from the second current source 52B. In this manner, substantially all of the first bias current I_dc1 and the second bias current I_dc2 flows through the respective write assist elements 30A and 30B, thereby enabling a more optimal bias current while ensuring the write assist elements 30A and 30B are not overbiased. In one embodiment, the isolation capacitors 56A and 56B are fabricated to be as small as possible to minimize chip area but also large enough to suppress noise above a predetermined bandwidth. That is, noise above the predetermined bandwidth is allowed to pass through the isolation capacitors 56A and 56B and thereby suppressed by the termination resistors Rtr1.

In the embodiment of FIG. 3C, a first terminal of the first termination resistor Rtr1 58A is coupled through the first isolation capacitor 56A to the first terminal of the first write assist element 30A to isolate the first termination resistor Rtr1 58A from the first bias current. A first terminal of the second termination resistor Rtr1 58B is coupled through the second isolation capacitor 56B to the first terminal of the second write assist element 30B to isolate the second termination resistor Rtr1 58B from the second bias current. A second terminal of the first termination resistor Rtr1 58A and a second terminal of the second termination resistor Rtr1 58B are coupled together at node 60.

In the embodiment of FIG. 3C, the output 62 of the amplifier 50 is coupled to the first terminal of the first write assist element 30A (and to the first current source 52A) through the first isolation capacitor 56A configured to isolate the first termination resistor Rtr1 58A from the first bias current. The output 62 of the amplifier 50 is coupled to the first terminal of the second write assist element 30B (and to the second current source 52B) through a second isolation capacitor 56B configured to isolate a second termination resistor Rtr1 58B from the second bias current. In the embodiment of FIG. 3C, the output 62 of the amplifier 50 drives node 60, but in other embodiments the output 62 of the amplifier 50 may drive the node between the first termination resistor Rtr1 58A and the first isolation capacitor 56A, or drive the node between the second termination resistor Rtr1 58B and the second isolation capacitor 56B.

Figure 4A:
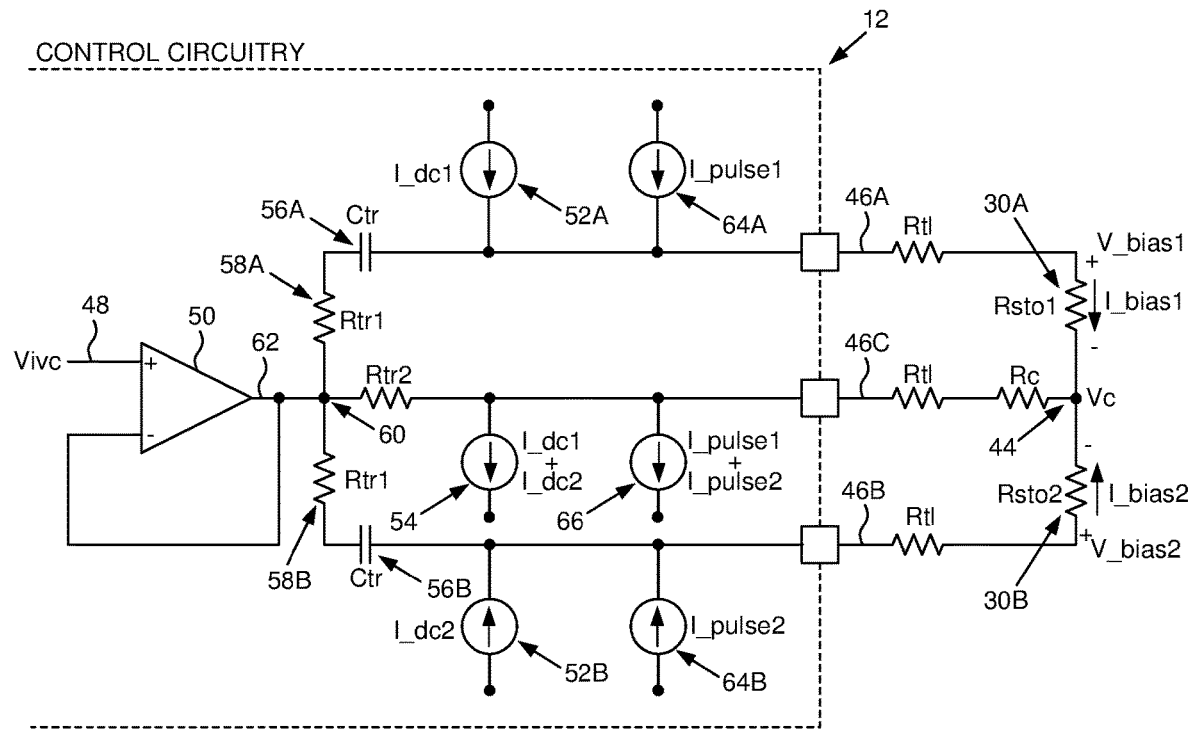
FIG. 4A shows an embodiment wherein the control circuitry is configured to bias the first and second STOs using a DC bias current and a pulsed bias current that is pulsed during the transitions of the write current during a write operation.

The control circuitry 12 of FIG. 4A comprises several resistors (Rc and Rtr2), and one or more capacitors (Ctr).

Figure 4B:
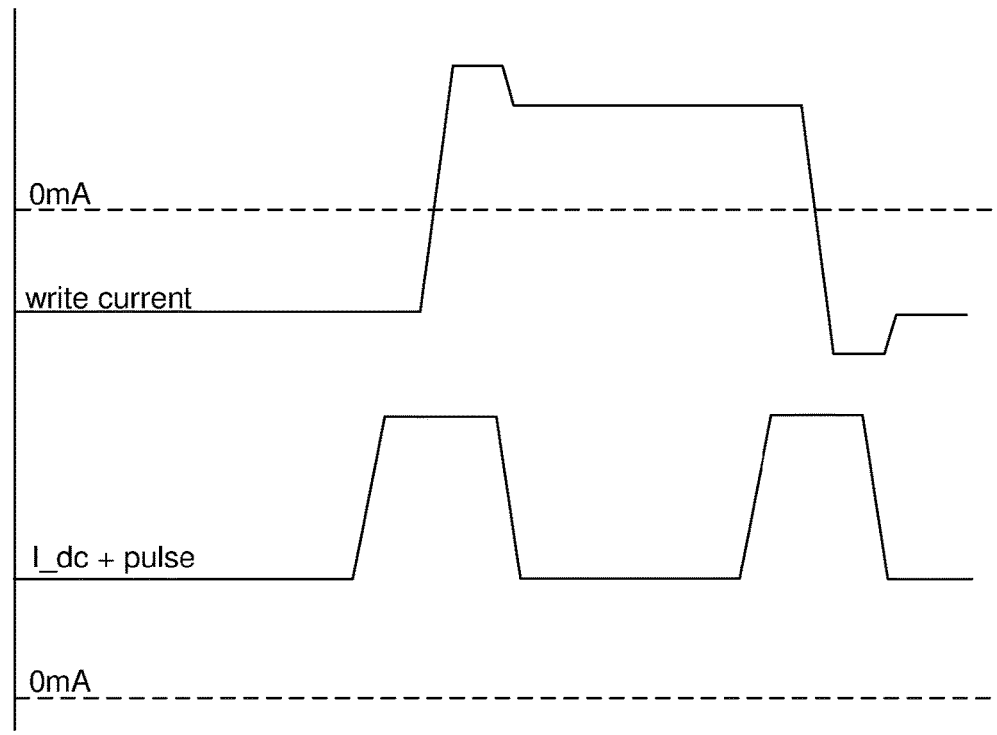
FIG. 4B shows a timing diagram according to an embodiment showing the pulsed bias current applied to the write assist element during the write current transitions of a write operation.

FIG. 4A shows control circuitry 12 according to an embodiment further comprising a first pulsed current source 64A configured to source a first pulsed bias current to the first terminal of the first write assist element 30A, and a second pulsed current source 64B configured to source a second pulsed bias current to the first terminal of the second write assist element 30B. In one embodiment, the pulsed bias current is added to the DC bias current I_dc when the write current is transitioning while writing data to the disk surface 2 as shown in the timing diagram of FIG. 4B, thereby increasing the efficiency of the write assist elements during the write operation and/or increasing the longevity of the write assist elements. A third pulsed current source 66 is configured to sink the sum of the pulsed bias currents from the third transmission line 46C in order to maintain the common mode voltage Vc at the target value configured by the input voltage Vivc 48. In one embodiment, the isolation capacitors 56A and 56B help suppress noise that may otherwise adversely affect operation of the write assist elements 30A and 30B while the pulsed current sources 64A and 64B are toggling.

In one embodiment, the input voltage Vivc 48 as well as the termination resistors Rtr1 and/or the isolation capacitors 56A and 56B may be programmable in order to facilitate variations between disk drives within the same product line of disk drives, as well as variations across different product lines. For example, in one embodiment the voltage potential of the disk surface 2 within each disk drive may be measured by the control circuitry 12 so that the input voltage Vivc 48 may be configured accordingly. Similarly, the control circuitry 12 may measure the resistance Rtl of the transmission lines in order to configure the termination resistors Rtr1 accordingly. In other embodiments, the parameters of the disk drives may be known within an acceptable tolerance, but may vary across different production lines. For example, a first production line of disk drives may employ the pulsed current sources 64A and 64B in the embodiment of FIG. 4A, and therefore require transmission lines having a higher characteristic impedance and therefore higher values for the termination resistors Rtr1 as compared to an embodiment that employs only the DC bias current sources 52A and 52B such as shown in FIG. 3C. Providing that certain parameters of the bias circuitry be programmable enables fabrication of control circuitry 12 capable of use in a production line of disk drives exhibiting production tolerances, as well as use in different production lines of disk drives having different design parameters.

In one embodiment, the polarity of the current sources disclosed in the above described embodiments (e.g., DC current sources 52A and 52B and current source 54) may be independently reversed so as to bias the write assist elements 30A and 30B as desired. In addition, the amplitude of the bias currents applied to each write assist element 30A and 30B may be independently configured to any suitable value by adjusting the amplitudes of the current sources. In one embodiment, the control circuitry 12 comprises a number of digital-to-analog converters (DACs) in order to configure the parameters of the biasing circuitry, such as the amplitude of input voltage Vivc that sets the interface voltage, and/or the polarity and/or amplitude of the bias currents applied to the write assist elements 30A and 30B.

In one embodiment, the components of the head 4 shown in FIG. 3A may be fabricated on a slider having a slider body, wherein the control circuitry 12 may further comprise components for setting a potential of the slider body to a level different from a potential of the main pole 32 (and different from the potential of the disk surface 2). FIG. 5A shows the control circuitry of FIG. 3C further comprising components for setting the potential (Vsb) of the slider body. The control circuitry of FIGS. 5A-5B comprises several resistors (Rc, Rtr2, Rfb, and Rsb), and one or more capacitors (Ctr). In this embodiment, the potential of the slider body Vsb may be set using either resistor Rsb1 or resistors Rsb2. That is, in one embodiment the control circuitry of FIG. 5A may comprise either resistor Rsb1 or resistors Rsb2 which is why the coupling lines for these components are represented with dashed lines. In one embodiment, the resistors Rsb2 should be kept relative large compared to Rsto1 and Rsto2 in order to keep I_bias1 and I_bias2 close to I_dc1 and I_dc2 respectively. In this case Vivc_sto is used to set the potential of the slider body Vsb to any suitable value relative to the potential of the disk surface 2 as well as the potential of the main pole 32. If Rsb1 is populated and Rsb2 is not populated, the Rsb1 resistance can be relatively small since Vsb is relative large impedance to ground. FIG. 5B shows an embodiment wherein the control circuitry 12 further comprises components for biasing a touchdown sensor Rtds as well as set the potential of the slider body Vsb by configuring the input voltage Vivc_tds. In one embodiment, the control circuitry 12 comprises the components shown in FIG. 5A and 5B except that resistors Rsb1 and Rsb2 in FIG. 5A are not needed in this embodiment (or are coupled to ground during the head fabrication process to maintain conductive materials at an equipotential voltage). In this embodiment, the input voltages Vivc_sto and Vivc_tds may be configured independently in order to set any suitable value for the potential of the main pole 32 Vc and the potential of the slider body Vsb.

Although the storage medium 2 shown in the embodiment of FIG. 1A is a magnetic disk of a magnetic disk drive, in other embodiments a different storage medium may be employed. For example, in one embodiment the storage medium 2 may comprise a magnetic tape of a magnetic tape drive. In addition, the storage medium 2 and attendant control circuitry 12 may facilitate any type of recording technologies, such as optical recording.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. Control circuitry comprising:
   a first current source configured to apply a first bias current to a first terminal of a first write assist element (WA1) of a data storage device;
   a second current source configured to apply a second bias current to a first terminal of a second write assist element (WA2) of the data storage device; and
   a voltage generator configured to apply a common mode voltage to a common node of the WA1 and WA2, wherein the voltage generator comprises an amplifier configured to generate the common mode voltage.

2. The control circuitry as recited in claim 1, wherein:
   an output of the amplifier is coupled to the first current source through a first isolation capacitor configured to isolate a first termination resistor from the first bias current; and
   the output of the amplifier is coupled to the second current source through a second isolation capacitor configured to isolate a second termination resistor from the second bias current.

3. The control circuitry as recited in claim 1, further comprising:
   a first terminal of a first termination resistor coupled through a first isolation capacitor to the first current source to isolate the first termination resistor from the first bias current; and
   a first terminal of a second termination resistor coupled through a second isolation capacitor to the second current source to isolate the second termination resistor from the second bias current;
   wherein a second terminal of the first termination resistor and a second terminal of the second termination resistor are coupled together.

4. The control circuitry as recited in claim 1, wherein the common mode voltage is different than a voltage potential of a storage medium of the data storage device.

5. The control circuitry as recited in claim 1, further comprising:
   a first output configured to couple to a first transmission line coupled to the first terminal of the WA1;
   a second output configured to couple to a second transmission line coupled to the first terminal of the WA2; and
   a third output configured to couple to a third transmission line coupled to the common node.

6. The control circuitry as recited in claim 5, wherein the control circuitry comprises a third current source configured to apply a third bias current to the third transmission line, wherein the third bias current substantially equals a sum of the first bias current and the second bias current.

7. A data storage device comprising:
   a storage medium;
   a head configured to access the storage medium, wherein:
      the head comprises a first write assist element (WA1) comprising a first terminal and a second terminal and a second write assist element (WA2) comprising a first terminal and a second terminal; and
      the second terminal of the WA1 and the second terminal of the WA2 are coupled together to form a common node; and
   control circuitry configured to:
      apply a first bias signal to the first terminal of the WA1;
      apply a second bias signal to the first terminal of the WA2; and
      apply a common mode voltage to the common node, wherein the control circuitry comprises an amplifier configured to generate the common mode voltage.

8. The data storage device as recited in claim 7, wherein the common mode voltage is different than a voltage potential of the storage medium.

9. The data storage device as recited in claim 7, wherein the first bias signal comprises a first bias current and the second bias signal comprises a second bias current.

10. The data storage device as recited in claim 9, wherein the control circuitry further comprises:
    a first terminal of a first termination resistor coupled through a first isolation capacitor to the first terminal of the WA1 to isolate the first termination resistor from the first bias current; and
    a first terminal of a second termination resistor coupled through a second isolation capacitor to the first terminal of the WA2 to isolate the second termination resistor from the second bias current;
    wherein a second terminal of the first termination resistor and a second terminal of the second termination resistor are coupled together.

11. The data storage device as recited in claim 9, wherein:
    an output of the amplifier is coupled to the first terminal of the WA1 through a first isolation capacitor configured to isolate a first termination resistor from the first bias current; and
    the output of the amplifier is coupled to the first terminal of the WA2 through a second isolation capacitor configured to isolate a second termination resistor from the second bias current.

12. The data storage device as recited in claim 9, further comprising:

a first transmission line coupling the control circuitry to the first terminal of the WA1;

a second transmission line coupling the control circuitry to the first terminal of the WA2; and a third transmission line coupling the control circuitry to the common node.

13. The data storage device as recited in claim 12, wherein the control circuitry comprises:

a first current source configured to apply the first bias current to the first transmission line;

a second current source configured to apply the second bias current to the second transmission line; and a third current source configured to apply a third bias current to the third transmission line, wherein the third bias current substantially equals a sum of the first bias current and the second bias current.

14. A data storage device comprising:

a storage medium;

a head configured to access the storage medium, wherein:

the head comprises a first write assist element (WA1) comprising a first terminal and a second terminal and a second write assist element (WA2) comprising a first terminal and a second terminal; and the second terminal of the WA1 and the second terminal of the WA2 are coupled together to form a common node; and a means for biasing the first terminal of the WA1;

a means for biasing the first terminal of the WA2; and a means for voltage biasing the common node of the WA1 and the WA2, wherein the means for voltage biasing the common node comprises an amplifier configured to generate a common mode voltage.

15. A data storage device comprising:

a storage medium;

a head configured to access the storage medium, wherein:

the head comprises a first write assist element (WA1) comprising a first terminal and a second terminal and a second write assist element (WA2) comprising a first terminal and a second terminal; and the second terminal of the WA1 and the second terminal of the WA2 are coupled together to form a common node; and a means for biasing the first terminal of the WA1;

a means for biasing the first terminal of the WA2; and a means for voltage biasing the common node of the WA1 and the WA2, wherein the means for voltage biasing the common node comprises an amplifier configured to generate a common mode voltage, wherein the common mode voltage is different than a voltage potential of the storage medium.

\* \* \* \* \*